United States Patent
Lee et al.

(10) Patent No.: US 8,738,007 B2
(45) Date of Patent: May 27, 2014

(54) METHOD OF ADMISSION CONTROL FOR HYBRID FEMTOCELL

(75) Inventors: Seung Que Lee, Daejeon (KR); Nam Hoon Park, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/233,452

(22) Filed: Sep. 15, 2011

(65) Prior Publication Data

US 2012/0064906 A1 Mar. 15, 2012

(30) Foreign Application Priority Data

Sep. 15, 2010 (KR) .................. 10-2010-0090531

(51) Int. Cl.
*H04W 36/00* (2009.01)
(52) U.S. Cl.
USPC .......... 455/441; 455/436; 455/41.2; 455/519; 370/331
(58) Field of Classification Search
CPC ..... H04W 36/04; H04W 36/08; H04W 36/18; H04W 36/24; H04W 36/32; H04W 36/34; H04W 36/36
USPC ..................... 455/436–444, 456.1–457, 41.2, 455/516–519; 370/331
See application file for complete search history.

(56) References Cited

U.S. PATENT DOCUMENTS

| | | | |
|---|---|---|---|
| 2009/0305699 A1 | 12/2009 | Deshpande et al. | |
| 2010/0130171 A1 | 5/2010 | Palanigounder et al. | |
| 2011/0201354 A1* | 8/2011 | Park et al. | 455/456.1 |
| 2012/0064893 A1* | 3/2012 | Reagor | 455/436 |

FOREIGN PATENT DOCUMENTS

| KR | 1020090108149 | 10/2009 |
|---|---|---|
| KR | 10-2010-0042204 | 4/2010 |
| KR | 1020100034885 | 4/2010 |

* cited by examiner

*Primary Examiner* — Marcos Torres
(74) *Attorney, Agent, or Firm* — Nelson Mullins Riley & Scarborough LLP; Anthony A. Laurentano, Esq.; Dipti Ramnarain, Esq.

(57) ABSTRACT

Provided is a method of admission control for a hybrid femtocell in a wireless communication system, in which the method is applied to a wireless communication system including a hybrid femto base station and a core network performing admission control of a mobile station terminal in a femtocell of the hybrid femto base station. The method of admission control for a hybrid femtocell performed by a core network according to an exemplary embodiment of the present invention includes determining whether a mobile station terminal has membership; determining whether speed information of the mobile station terminal exists; and assigning a probability value to the mobile station terminal depending on the membership and the speed information of the mobile station terminal.

11 Claims, 4 Drawing Sheets

US 8,738,007 B2

METHOD OF ADMISSION CONTROL FOR HYBRID FEMTOCELL

CROSS-REFERENCE TO RELATED APPLICATIONS

This application claims priority under 35 U.S.C. §119 to Korean Patent Application No. 10-2010-0090531, filed on Sep. 15, 2010, in the Korean Intellectual Property Office, the disclosure of which is incorporated herein by reference in its entirety.

TECHNICAL FIELD

The present invention relates to a method of admission control for a hybrid femtocell in a wireless communication system, and more particularly, to a method of admission control for a hybrid femtocell that efficiently controls interference due to a mobile station terminal in admission control of the mobile station terminal.

BACKGROUND

In a cellular wireless communication system, a channel status is deteriorated due to a geographical requirement in a cell, a distance between a terminal and a base station, or movement of the terminal, and as a result, communication between the terminal and the base station is smoothly performed. For example, an electric wave shadow area is formed due to an enclosed building such as an office or a housing even in a service area of the base station. Therefore, a wireless communication system provides femtocell service for solving a problem with service in the radio wave shadow area and supplying high-speed data service.

The femtocell is a miniaturized mobile communication base station that connects to a core network of mobile communication via broadband that is installed indoors such as in a home or office. The word femtocell is a compound word formed from the word 'femto' meaning 10-15 and the word 'cell' meaning a coverage area for mobile communication, and means a base station capable of providing a coverage having a cell radius of 10 m or less.

Since a method of admission control for a femtocell which is performed by a core network in a wireless communication system according to the related art uses only information on membership of the mobile station terminal that requests a network access, there is a limitation in controlling interference caused when the mobile station terminal connects to a macro cell around a hybrid femtocell.

Accordingly, the femtocell in the wireless communication system needs alternatives for reducing interference caused by a plurality of mobile station terminals that request access.

SUMMARY

The present invention has been made in an effort to provide a method of admission control for a hybrid femtocell in a wireless communication system, in which the method is applied to a wireless communication system including a hybrid femto base station and a core network performing admission control of a mobile station terminal in a femtocell of the hybrid femto base station.

An exemplary embodiment of the present invention provides a method of admission control for a hybrid femtocell performed by a core network, including: determining whether a mobile station terminal has membership; determining whether speed information of the mobile station terminal exists; and assigning a probability value to the mobile station terminal depending on the membership and the speed information of the mobile station terminal.

Other features and aspects will be apparent from the following detailed description, the drawings, and the claims.

DETAILED DESCRIPTION OF EMBODIMENTS

Figure 1:
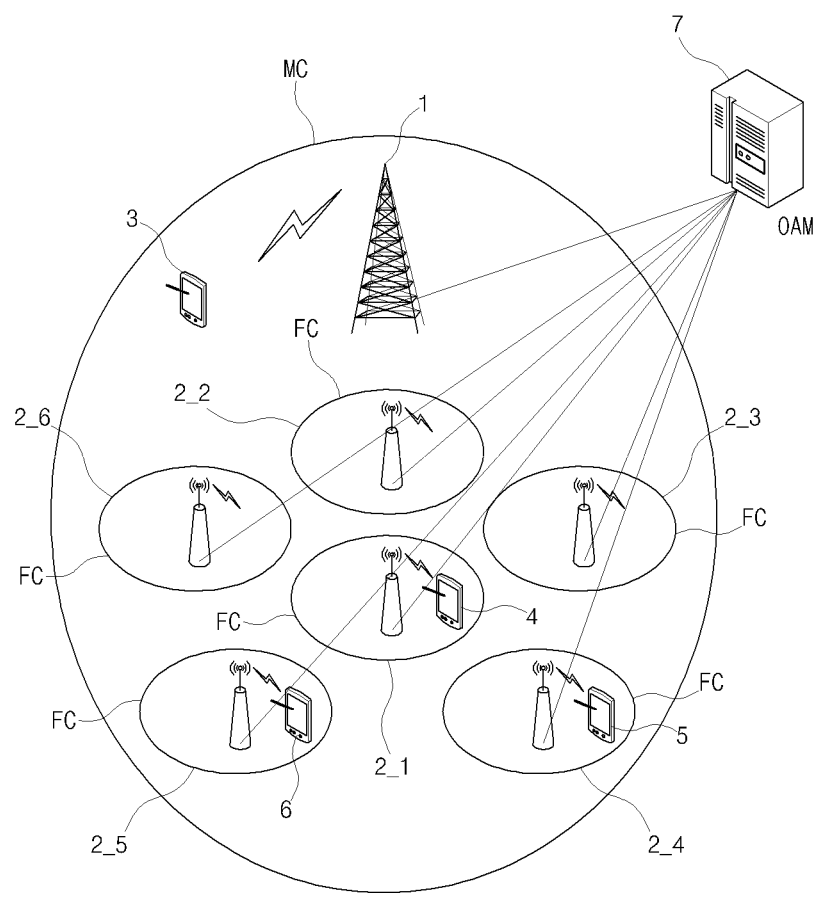
FIG. 1 is a configuration view of a wireless communication system including a femto base station according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. For the purposes of this description, the terms hybrid femtocell, femto base station, and base station may be used interchangeably. Also, descriptions of well-known functions and constructions may be omitted for increased clarity and conciseness.

A wireless communication system including a femto base station according to an exemplary embodiment of the present invention is described with reference to FIG. 1. FIG. 1 is a configuration view of a wireless communication system including a femto base station according to an exemplary embodiment of the present invention.

Referring to FIG. 1, a base station 1 controls one macro cell MC. In addition, at least one femtocell FC controlled by at least one femto base station may be positioned in the macro cell MC.

Since a first terminal 3 is positioned in the macro cell MC but not in the femtocell FC, the first terminal 3 connects to the base station 1 to perform communication. If the first terminal 3 moves in the femtocell FC, the first terminal 3 connects to the femto base stations 2_1, 2_2, 2_3, 2_4, 2_5, and 2_6 to perform communication.

Since a second terminal 4 is positioned in the femtocell FC, the second terminal 4 connects to the femto base station 2_1 to perform communication. If the second terminal 4 moves out of the femtocell FC, the second terminal 4 connects to the base station 1 to perform communication.

In this case, the femto base stations 2_1, 2_2, 2_3, 2_4, 2_5, and 2_6 may operate in any one type of an open access femto base station, a closed subscriber group (CSG) femto base station, and a hybrid access femto base station according to the limit condition of connectable terminals 3, 4, 5, and 6.

The open access femto base station means a base station that all terminals subscribing to corresponding mobile communication service can use. The CSG femto base station means a base station that only terminals designated by the consent of an installer of the femto base station and a mobile communication service provider can use.

The hybrid access femto base station means a base station supporting both of the open access type and the CSG type. That is, the hybrid access base station operates as the CSG femto base station for member terminals of a closed subscriber group and as the open access femto base station for non-member terminals of the closed subscriber group.

In the case where the femto base stations 2_1, 2_2, 2_3, 2_4, 2_5, and 2_6 operate as the open access or hybrid access femto base stations, when the first terminal 3 and the second terminal 4 are positioned in the femtocells FC, the first terminal 3 and the second terminal 4 connect to the femto base stations 2_1, 2_2, 2_3, 2_4, 2_5, and 2_6 to perform communication.

If the femto base stations 2_1, 2_2, 2_3, 2_4, 2_5, and 2_6 are the CSG femto base stations, even though the first terminal 3 and the second terminal 4 are positioned in the femtocells FC, the first terminal 3 and the second terminal 4 are non-member terminals of the closed subscriber group and therefore cannot connect to the femto base stations 2_1, 2_2, 2_3, 2_4, 2_5, and 2_6.

That is, in the case where the first terminal 3 and the second terminal 4 are the non-member terminals of the closed subscriber group, the first terminal 3 and the second terminal 4 should connect to the base station 1 even in the femtocells FC to perform communication.

As described above, the operation method of the femto base station in the wireless communication system including the femto base station is described in detail. Hereinafter, a hybrid femtocell according to the present invention is described in detail.

The hybrid femtocell means a cell that is controlled by a base station among user access control modes of a base station. The hybrid femtocell is a concept that is devised to reduce interference to the femtocell caused when the non-member terminal of the closed subscriber group connects and communicates with a macro cell near the femtocell. That is, the hybrid femtocell receives a subscriber terminal in its own cell to prevent the subscriber terminal from connecting to the macro cell.

The hybrid femtocell provides service to both of the member terminal and non-member terminal of the closed subscriber group, but should reflect a property of the closed type fundamentally. That is, when providing the service to the non-member of the closed subscriber group, the influence of the providing of the service on the member of the closed subscriber group should be minimized.

To this end, the hybrid femtocell discriminates between the member and the non-member by a membership check and according to the result, performs differential admission control.

For example, when it is expected that a base station operating in a hybrid mode at present exceeds processing capability, the base station admits a network access request of the member terminal of the closed subscriber group, while refusing to admit a network access request of the non-member terminal.

In a saturation state where no additional subscriber is admitted at present, when a network access request of the member terminal of the closed subscriber group is received, the base station interrupts service which is being processed at present and is provided to the non-member terminal of the closed subscriber group, and may admit a request of the member terminal of the closed subscriber group.

As such, the hybrid cell first provides the service to the member of the closed subscriber group by discriminating between the member and the non-member of the closed subscriber group and performing differential admission control therebetween.

The method of admission control for the hybrid femtocell according to the present invention is characterized by using the movement speed of the subscriber terminal in addition to being based on membership of the subscriber. Hereinafter, the method of admission control for the hybrid femtocell according to an exemplary embodiment of the present invention is described in detail with reference to FIGS. 2 and 3.

Figure 2:
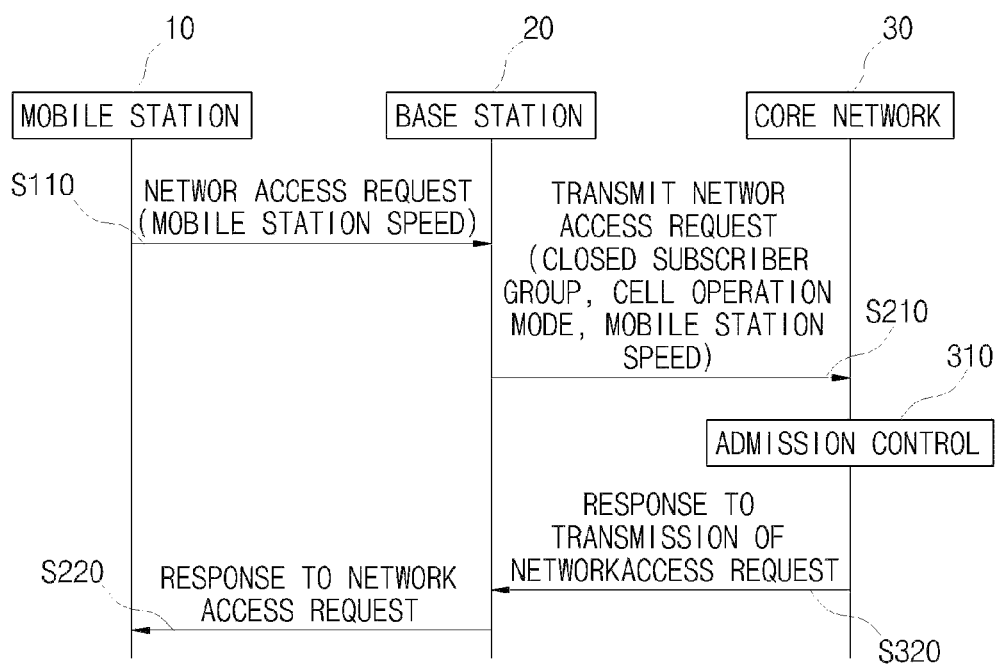
FIG. 2 is a flowchart showing a method of admission control for a network access request of a mobile station terminal in a hybrid femtocell according to an exemplary embodiment of the present invention.

A method of admission control that is performed by the hybrid femtocell, also referred to as the base station 20, in response to the network access request of the mobile station terminal in the hybrid femtocell according to an exemplary embodiment of the present invention is described with reference to FIG. 2. FIG. 2 is a flowchart showing the method of admission control for the network access request of the mobile station terminal in the hybrid femtocell according to an exemplary embodiment of the present invention.

Referring to FIG. 2, when a mobile station terminal 10 attempts an access to a network in the hybrid femtocell, the mobile station terminal 10 transmits a network access request message to a base station 20 via a radio interface (S110). In this case, the mobile station terminal 10 may transmit present speed information of the mobile station terminal 10 as well as a basic parameter needed for network access to the base station 20.

Herein, the speed of the mobile station terminal 10 may be calculated by using a GPS. The mobile station terminal 10 is a subject of requesting a positional registration to an exchanger based on a speed value obtained by measuring its own movement speed, and more specifically, the mobile station terminal 10 is mounted with a GPS receiver to obtain a GPS coordinate value of the mobile station terminal 10 from the GPS receiver. In this case, the GPS coordinate value is measured at a predetermined period and the mobile station terminal 10 compares a measured GPS coordinate value with a GPS coordinate value measured at the previous period, and as a result, measures its own average speed value.

As described above, the case where the corresponding mobile station terminal 10 is mounted with the GPS receiver is described. In the case where the mobile station terminal 10 is not mounted with the GPS receiver, the mobile station terminal 10 receives a GPS coordinate value of a base station location from the base station 20 and compares the received GPS coordinate value with a previously received GPS coordinate value to measure its own movement speed.

In the case where the mobile station terminal 10 is not mounted with the GPS receiver, the base station 20 serves to provide a GPS coordinate value of the location of the base station 20 and when a handoff occurs due to a positional movement of the corresponding mobile station terminal 10, a base station in an area where the mobile station terminal 10 is positioned provides the GPS coordinate value.

The speed of the mobile station terminal 10 can be estimated by using information collected by a gyro sensor mounted on the mobile station terminal 10 and may be obtained by various methods such as extracting through measurement, but the present invention is not limited thereto.

In the case where the mobile station terminal 10 is not mounted with the GPS receiver and a device for calculating the speed such as the gyro sensor, present speed information may be omitted.

The base station 20 receiving the network access request message from the mobile station terminal 10 transmits its own closed subscriber group identifier, a cell operation mode, the present speed information of the mobile station terminal 10, and the like together with the received network access request message to a core network 30 (S210). In this case, the present speed information of the mobile station terminal 10 may be received from the mobile station terminal 10 and alternatively, estimated by the base station 20.

For example, the base station 20 can estimate the present speed of the mobile station terminal 10 by measuring the variation in signal strength in a cell of the mobile station terminal 10. Specifically, when the mobile station terminal 10 approaches the base station 20, a signal of the mobile station terminal 10 received by the base station 20 is strong, and when the mobile station terminal 10 is far away from the base station 20, receiving sensitivity of the base station 20 cannot help being reduced.

That is, the strength of the signal of the mobile station terminal 10 received by the base station 20 varies inside the cell according to a relative position of the mobile station terminal 10. By using the variation in signal strength for a predetermined time, it is possible to estimate a displacement of the mobile station terminal 10 and by dividing the estimated displacement by the predetermined time, it is possible to obtain the present average speed of the mobile station terminal 10.

When the network access request message of the mobile station terminal 10 is transferred to the core network 30 by the base station 20, the core network 30 performs the membership check for the mobile station terminal 10 and performs admission control using whether the mobile station terminal 10 has the membership and the speed information (S310).

In this case, the core network 30 sets a femto base station 20 and an S1 interface so as to manage the femto base station 20 that is connected in the network. The S1 interface is set so that the femtocell base station 20 exchanges control information for supporting movement of the mobile station terminal 10 by exchanging the signals with the core network 30.

For example, the core network 30 is connected to the base station 20 via the S1 interface during an initial setting process to store the control information for managing the base station 20 in an internal database.

In this case, the control information includes information on a closed subscriber group belonging to the base station 20 and a cell operation mode.

The core network 30 may determine whether the mobile station terminal 10 transmitting the network access request message belongs to the closed subscriber group by comparing the closed subscriber group information stored in the internal database with the closed subscriber group identifier information received from the base station 20 in S210.

The core network 30 transmits a message including a result of admission or non-admission depending on the result of admission control in S310 to the base station 20 (S320) and the base station 20 transmits the message to the mobile station terminal 10 (S220).

Figure 3:
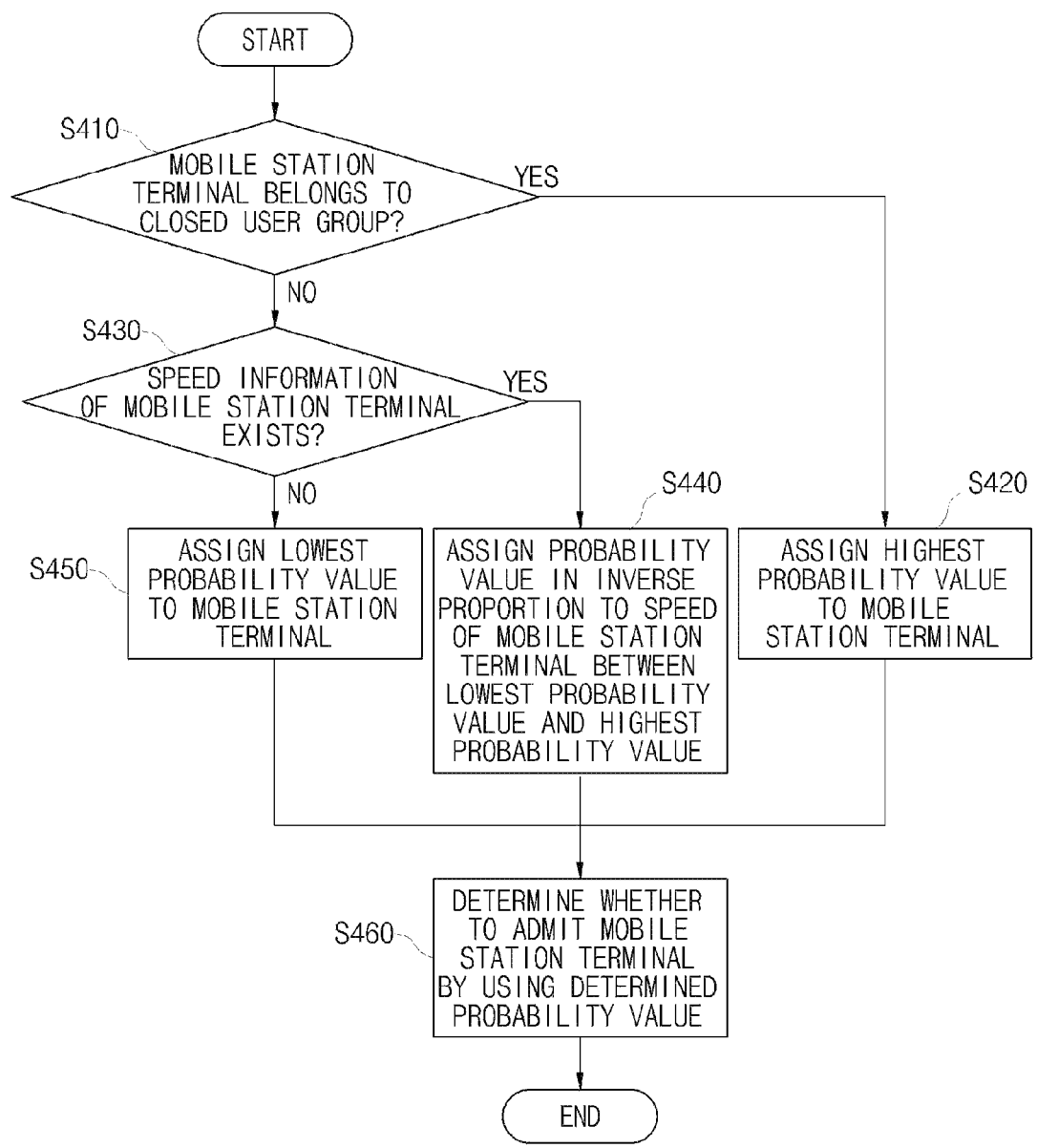
FIG. 3 is a flowchart showing a method of admission control for a hybrid femtocell that is performed by a core network according to an exemplary embodiment of the present invention.

A procedure of admission control for the mobile station terminal performed by the core network in S310 is described with reference to FIG. 3. FIG. 3 is a flowchart showing a method of admission control for a hybrid femtocell that is performed by a core network according to an exemplary embodiment of the present invention.

First, the core network determines whether the mobile station terminal transmitting the network access request message is a member subscriber belonging to a closed user group (S410).

The membership check is a procedure for determining whether the mobile station terminal belongs to the closed subscriber group of the base station and may be performed based on data stored in the internal database of the core network.

Specifically, the core network determines whether the mobile station terminal transmitting the network access request message belongs to the closed subscriber group by comparing the closed subscriber group information stored in the internal database with closed subscriber group identifier information received from the base station.

As a result of the determination, when the mobile station terminal transmitting the network access request message belongs to the closed subscriber group, the preset highest probability value is assigned to the mobile station terminal (S420).

Herein, a probability value is assigned to each mobile station terminal transmitting the network access request message and the core network determines final admission for the mobile station terminal transmitting the network access request message based on the probability value. That is, the possibility that network access of the mobile station terminal having a high probability value is admitted by the core network is high, while the possibility that network access of the mobile station terminal having a low probability value is refused by the core network is high.

As such, the core network performs differential admission control for the mobile station terminal based on the probability value, thereby reflecting a property of the closed type in the hybrid femtocell.

When a mobile station terminal transmitting a network access request message does not belong to the closed subscriber group, the core network determines whether speed information on the mobile station terminal exists or not (S430).

As a result of the determination, when the speed information on the mobile station terminal does not exist, the preset lowest probability value is assigned to the corresponding mobile station terminal (S450) and when the speed information on the mobile station terminal exists, a probability value in inverse proportion to the speed information of the mobile station terminal in the range between the lowest probability value and the highest probability value is assigned to the corresponding mobile station terminal (S440).

That is, when the mobile station terminal belongs to the closed subscriber group, the core network assigns the highest probability value (e.g., 0.8) to the mobile station terminal, when the mobile station terminal does not belong to the closed subscriber group and the speed information does not exist, the core network assigns the lowest probability value (e.g., 0.2), and when the mobile station terminal does not belong to the closed subscriber group but the speed information exists, the core network assigns a probability value in inverse proportion to the corresponding speed information in the range (e.g., 0.2-0.8) between the highest probability value and the lowest probability value (for example, when the speed of the mobile station terminal is 20 Km/h, 0.7 is assigned, and when the speed is 80 Km/h, 0.3 is assigned).

This is based on the principle in which when the mobile station terminal moves at a low speed or stops, the possibility of continuously connecting to the macro cell and causing interference to the femto base station is high and when the mobile station terminal moves at a high speed, the possibility that interference to the femto base station is temporary is high.

That is, when the mobile station terminal moves at a low speed, the core network assigns a high probability value to the mobile station terminal to accommodate the mobile station terminal in the femtocell, such that the mobile station terminal is prevented from connecting to the macro cell, thereby reducing interference caused as the mobile station terminal connects to the macro cell.

Next, the core network uses the determined probability value to finally determine admission for the mobile station terminal transmitting the network access request message (S460).

Figure 4:
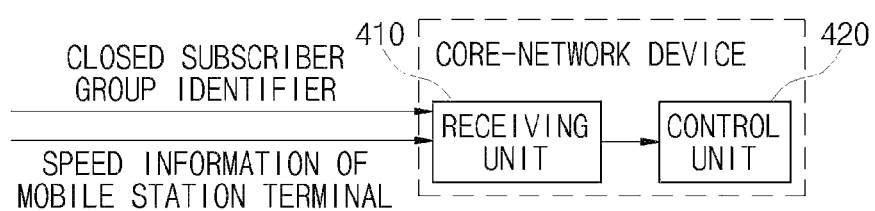
FIG. 4 is a block diagram showing a core-network device for admission control for a hybrid femtocell according to another exemplary embodiment of the present invention.

A core-network device for admission control for a hybrid femtocell according to another exemplary embodiment of the present invention is described with reference to FIG. 4. FIG. 4 is a block diagram showing a core-network device for admission control for a hybrid femtocell according to another exemplary embodiment of the present invention.

Referring to FIG. 4, the core-network device according to another exemplary embodiment of the present invention includes a receiving unit 410 and a control unit 420.

The receiving unit 410 receives information including a closed subscriber group identifier of a mobile station terminal, speed information of the mobile station terminal, a cell operation mode, and the like from a base station.

The control unit 420 assigns a probability value for network access admission control to the mobile station terminal according to the membership and the speed information of the mobile station terminal by using the received closed subscriber group identifier of the mobile station terminal and speed information of the mobile station terminal.

For example, the control unit 420 determines whether the mobile station terminal transmitting the network access request message is a member subscriber belonging to the closed user group or not. Specifically, the control unit 420 determines whether the mobile station terminal transmitting the network access request message belongs to the closed subscriber group by comparing the closed subscriber group information stored in an internal database with closed subscriber group identifier information received from the base station.

As a result of the determination, when the mobile station terminal transmitting the network access request message belongs to the closed subscriber group, the control unit 420 assigns the preset highest probability value to the mobile station terminal and when the mobile station terminal transmitting the network access request message does not belong to the closed subscriber group, the control unit 420 determines whether speed information of the mobile station terminal exists or not.

As a result of the determination, when the speed information of the mobile station terminal does not exist, the control unit 420 assigns the preset lowest probability value to the corresponding mobile station terminal and when the speed information of the mobile station terminal exists, the control unit 420 assigns a probability value in inverse proportion to the speed information of the mobile station terminal in the range between the lowest probability value and the highest probability value to the corresponding mobile station terminal.

That is, when the mobile station terminal belongs to the closed subscriber group, the control unit 420 assigns the highest probability value (e.g., 0.8) to the mobile station terminal, when the mobile station terminal does not belong to the closed subscriber group and the speed information does not exist, the control unit 420 assigns the lowest probability value (e.g., 0.2), and when the mobile station terminal does not belong to the closed subscriber group but the speed information exists, the control unit 420 assigns a probability value in inverse proportion to the corresponding speed information in the range (e.g., 0.2-0.8) between the highest probability value and the lowest probability value (for example, when the speed of the mobile station terminal is 20 Km/h, 0.7 is assigned, and when the speed is 80 Km/h, 0.3 is assigned).

This is based on the principle in which when the mobile station terminal moves at a low speed or stops, the possibility of continuously connecting to the macro cell and causing interference to the femto base station is high and when the mobile station terminal moves at a high speed, the possibility that interference to the femto base station is temporary is high.

According to the present invention, it is possible to efficiently control interference due to the mobile station terminal as compared with the related art by applying the speed information of the mobile station terminal to the method of admission control for the hybrid femtocell.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of admission control for a hybrid femtocell performed by a hybrid femto base station, comprising:
    receiving a network access request message from a mobile station terminal;
    transmitting the network access request message and speed information, when the speed information exists, of the mobile station terminal to a core network;
    receiving a response message to the network access request from the core network; and
    transmitting the response message to the network access request to the mobile station terminal, wherein the response message to the network access request comprises a probability value to the mobile station terminal such that:
        when the mobile station terminal is a member of a closed subscriber group, a highest probability value is assigned,
        when the mobile station terminal is not a member of the closed subscriber group and speed information for the mobile terminal does not exist, a lowest probability value is assigned, and
        when the mobile station terminal is not a member of the closed subscriber group and speed information for the mobile terminal exists, an intermediate probability value is assigned, wherein the intermediate probability value is in a range between the highest probability value and the lowest probability value and is inversely proportional to the speed information, wherein the speed information is a measurement of a movement speed of the mobile terminal through a macro cell,
    wherein the highest probability value, the lowest probability value, or the intermediate probability value is used in determining the admission control for the hybrid femtocell.

2. The method of claim 1, wherein the speed information of the mobile station terminal is obtained by the mobile station terminal and received from the mobile station terminal.

3. The method of claim 2, wherein the mobile station terminal is mounted with a GPS receiving module to measure a present GPS coordinate value at a predetermined specific period and extract an average speed by comparing time difference of measured GPS coordinate values.

4. The method of claim 1, wherein the speed information of the mobile station terminal is obtained by the hybrid femto base station and transmitted to the core network.

5. The method of claim 4, wherein the speed information of the mobile station terminal is obtained by measuring variation in signal strength of the mobile station terminal by the hybrid femto base station.

6. The method of claim 1, wherein when the hybrid femtocell is in a saturation state and a network access request message from a mobile station terminal is received, service of a currently processing mobile station terminal that is not a member of the closed subscriber group is interrupted and the service is provided to a mobile station terminal that is a member of the closed subscriber group.

7. A method of admission control for a hybrid femtocell performed by a core network, comprising:
   performing admission control for a mobile station terminal, wherein admission control comprises of determining a probability value to the mobile station terminal such that:
      when the mobile station terminal is a member of a closed subscriber group, a highest probability value is assigned,
      when the mobile station terminal is not a member of the closed subscriber group and speed information for the mobile terminal does not exist, a lowest probability value is assigned, and
      when the mobile station terminal is not a member of the closed subscriber group and the speed information for the mobile terminal exists, an intermediate probability value is assigned, wherein the intermediate probability value is in a range between the highest probability value and the lowest probability value and is inversely proportional to the speed information, wherein the speed information is a measurement of a movement speed of the mobile terminal through a macro cell,
   wherein the probability value is equal to the highest probability value, the lowest probability value, or the intermediate probability.

8. The method of claim 7, wherein, when the hybrid femtocell is in a saturation state, service of a currently processing mobile station terminal that is not a member of the closed subscriber group is interrupted and the service is provided to a mobile station terminal that is a member of the closed subscriber group.

9. A method of admission control for a hybrid femtocell performed by a core network, comprising:
   determining whether a mobile station terminal has membership;
   determining whether speed information of the mobile station terminal exists; and
   assigning a probability value to the mobile station terminal such that:
      when the mobile station terminal is a member of a closed subscriber group, a highest probability value is assigned,
      when the mobile station terminal is not a member of the closed subscriber group and speed information for the mobile terminal does not exist, a lowest probability value is assigned, and
      when the mobile station terminal is not a member of the closed subscriber group and the speed information for the mobile terminal exists, an intermediate probability value is assigned, wherein the intermediate probability value is in a range between the highest probability value and the lowest probability value and is inversely proportional to the speed information, wherein the speed information is a measurement of a movement speed of the mobile terminal through a macro cell,
   wherein the highest probability value, the lowest probability value, or the intermediate probability value are the possibility that the core network will admit network access of the mobile station terminal.

10. The method of claim 9, wherein the determining of whether the mobile station terminal has membership includes
   receiving a closed subscriber group identifier of the mobile station terminal from the hybrid femto base station; and
   comparing the closed subscriber group identifier with a closed subscriber group list stored in a database.

11. The method of claim 9, wherein, when the hybrid femtocell is in a saturation state, service of a currently processing mobile station terminal that is not a member of the closed subscriber group is interrupted and the service is provided to a mobile station terminal that is a member of the closed subscriber group.

* * * * *